(12) United States Patent
Sweetman et al.

(10) Patent No.: US 9,498,824 B2
(45) Date of Patent: *Nov. 22, 2016

(54) METHOD OF JOINING SINTERED PARTS OF DIFFERENT SIZES AND SHAPES (71) Applicant: SANDVIK INTELLECTUAL PROPERTY AB, Sandviken (SE)

(72) Inventors: Gary William Sweetman, Coventry (GB); Ihsan Al-Dawery, Coventry (GB); Jonathan Fair, Solihull (GB)

(73) Assignee: SANFVIK INTELLECTUAL PROPERTY AB, Sandviken (SE)

( * ) Notice: Subject to any disclaimer, the term of this patent is extended or adjusted under 35 U.S.C. 154(b) by 22 days.

This patent is subject to a terminal disclaimer.

(21) Appl. No.: 14/211,054

(22) Filed: Mar. 14, 2014

(65) Prior Publication Data
US 2014/0260808 A1 Sep. 18, 2014

Related U.S. Application Data

(60) Provisional application No. 61/800,836, filed on Mar. 15, 2013.

(51) Int. Cl.
*B23P 15/32* (2006.01)
*B22F 7/06* (2006.01)
*B23B 51/00* (2006.01)
(Continued)

(52) U.S. Cl.
CPC ............. *B22F 7/062* (2013.01); *B23B 51/00* (2013.01); *B23B 51/02* (2013.01); *B23B 51/06* (2013.01); *C22C 29/02* (2013.01); *B22F 2005/001* (2013.01); *B23P 15/28* (2013.01); *B23P 15/32* (2013.01); *Y10T 408/458* (2015.01);
(Continued)

(58) Field of Classification Search
CPC ......... B22F 7/062; B22F 7/064; B23P 15/32
USPC ...................... 76/108.1–108.6; 228/165, 193
See application file for complete search history.

(56) References Cited

U.S. PATENT DOCUMENTS 4,350,528 A 9/1982 Engle
4,386,959 A 6/1983 Frehn
(Continued)

FOREIGN PATENT DOCUMENTS

EP 0380096 A1 8/1990
EP 1502721 A2 2/2005
(Continued)

OTHER PUBLICATIONS

PCT/IB2014/059796 ISR and Written Opinion.

*Primary Examiner* — Jason Daniel Prone
(74) *Attorney, Agent, or Firm* — Corinne R. Gorski (57) ABSTRACT

A method of joining a plurality of parts to form a unitary body. At least two sintered parts are provided. At least one of the sintered parts has at least one internal cavity. Each of the parts is formed of a hard metal composition of material. The at least two sintered parts are assembled into the shape of a unitary body. Each of the at least two sintered parts has a joining surface and when each joining surface is brought into contact the surfaces form a bonding interface therebetween. The assembled parts are subjected to a vacuum or gas atmosphere, without the application of external pressure, and to a temperature sufficient to fuse the at least two sintered parts together at the bonding interface to form the unitary body.

24 Claims, 6 Drawing Sheets

(51) Int. Cl.
*B23B 51/06* (2006.01)
*B23B 51/02* (2006.01)
*C22C 29/02* (2006.01)
*B23P 15/28* (2006.01)
*B22F 5/00* (2006.01)

(52) U.S. Cl.
CPC ......... *Y10T408/89* (2015.01); *Y10T 408/9095* (2015.01); *Y10T 408/9097* (2015.01)

(56) References Cited

U.S. PATENT DOCUMENTS

| | | | |
|---|---|---|---|
| 4,991,467 A * | 2/1991 | Packer | B23B 51/02 76/108.6 |
| 5,186,892 A | 2/1993 | Pope | |
| 5,333,520 A | 8/1994 | Fischer et al. | |
| 5,839,329 A * | 11/1998 | Smith | B22F 3/1055 76/108.2 |
| 5,868,885 A * | 2/1999 | Crockett | B24D 3/06 76/108.1 |
| 5,948,523 A * | 9/1999 | Carpenter | B21C 3/02 407/119 |
| 6,315,945 B1 | 11/2001 | Macki et al. | |
| 6,908,688 B1 | 6/2005 | Majagi et al. | |
| 7,296,497 B2 * | 11/2007 | Kugelberg | B21C 23/147 76/108.6 |
| 7,340,978 B2 * | 3/2008 | Kugelberg | B22F 3/22 76/108.6 |
| 7,387,658 B2 * | 6/2008 | Grearson | C22C 1/051 419/36 |
| 7,469,972 B2 | 12/2008 | Hall et al. | |
| 8,091,459 B2 * | 1/2012 | Kugelberg | B22F 3/22 76/108.6 |
| 8,191,658 B2 * | 6/2012 | Schmitz | B24D 99/005 76/108.2 |
| 2006/0288820 A1 | 12/2006 | Mirchandani | |
| 2008/0247899 A1 * | 10/2008 | Cho | B22F 5/08 76/108.6 |
| 2011/0020085 A1 | 1/2011 | Glaser et al. | |
| 2012/0087746 A1 | 4/2012 | Fang | |
| 2014/0271003 A1 * | 9/2014 | Sweetman | B22F 7/062 76/108.1 |
| 2014/0271008 A1 * | 9/2014 | Sweetman | B22F 7/062 76/108.1 |

FOREIGN PATENT DOCUMENTS

| | | | |
|---|---|---|---|
| EP | 1593442 | | 11/2005 |
| EP | 1739197 A1 * | | 1/2007 |
| GB | 2424610 A * | | 10/2006 |
| JP | 2005046995 A * | | 2/2005 |
| JP | 2005324321 A * | | 11/2005 |
| JP | 2008132539 A | | 6/2008 |
| KR | 20050013493 A * | | 2/2005 |
| KR | 20060047698 A * | | 5/2006 |
| WO | 0211931 | | 2/2002 |
| WO | 2008051588 A2 | | 5/2008 |

\* cited by examiner

METHOD OF JOINING SINTERED PARTS OF DIFFERENT SIZES AND SHAPES

RELATED APPLICATION DATA

This application is related to U.S. Pat. application Ser. Nos. 14/211,020 and 14/211,105, both filed on Mar. 14, 2014 and assigned to the same assignee of the present application.

TECHNICAL FIELD AND INDUSTRIAL APPLICABILITY

The present disclosure relates to a method of joining different sized and/or shaped parts or members to form a unitary body, and more particularly, to a method for joining sintered parts of different sizes and/or shapes to form a unitary tool or wear part.

SUMMARY

In one aspect there is provided a method of joining a plurality of parts to form a unitary body. At least two sintered parts are provided. Each of the at least two parts is formed of a hard metal composition of material. The at least two sintered parts are assembled into the shape of a unitary body. At least one of the sintered parts has at least one internal cavity. Each of the at least two sintered parts has a joining surface and when each joining surface is brought into contact the surfaces form a bonding interface therebetween. The assembled sintered parts are subjected to a vacuum or gas atmosphere, without the application of external pressure, and to a temperature sufficient to fuse the at least two sintered parts together at the bonding interface to form the unitary body.

In another aspect a wear resistant tool includes a plurality of sintered parts. Each of the plurality of sintered parts is formed of a hard metal composition of material, wherein the plurality of sintered parts can be assembled into a shape of a unitary body. A joining surface is disposed on each of the plurality of sintered parts, wherein when the parts are assembled each joining surface is brought into contact to form a bonding interface therebetween, such that when the assembled parts are subject to a vacuum or gas atmosphere, without the application of external pressure, and to a temperature sufficient to fuse the plurality of parts, the plurality of sintered parts are joined together at a respective bonding interface to form the unitary body.

These and other objects, features, aspects, and advantages of the present disclosure will become more apparent from the following detailed description of the preferred embodiment relative to the accompanied drawings, in which:

DETAILED DESCRIPTION

High wear resistant materials, such as cemented carbide, are popular for rock and metal drilling tools and for wear parts. Bodies of these materials are usually made by powder metallurgical methods, namely, pressing and sintering.

There are numerous methods for joining multi-member cemented carbide bodies. A multi-member cemented carbide body can be independently formed of distinct green bodies. Sometimes, the independently formed green bodies are also independently sintered and, sometimes after grinding, assembled, for example, by soldering, brazing, direct pressing or shrink fitting to form a multiple-region cemented carbide body. Hence, the desired form of the sintered body is usually obtained before sintering after which the partial bodies are sintered together to form a body with a desired, often complex geometry, because machining of the sintered body is expensive.

For example, standard methods of producing multi-sized tools involve producing parts having the maximum size and then removing material before sintering, after sintering or both. This results in a significant amount of the cemented carbide being lost.

Alternatively, independently formed bodies are assembled and then sintered. However, the different combinations of the same ingredients that comprise the independently formed bodies respond to sintering differently. Each combination of ingredients responds uniquely to a sintering temperature, time, atmosphere or any combination of the proceeding and thus shrinks uniquely.

Moreover, there is the disadvantage due to the large amounts of liquid phase migrating significant distances into each of the bodies. This sometimes results in severe compositional changes.

It is known to form complex shaped articles comprised of dissimilar materials, wherein the interface between the materials may be very narrow. See U.S. Pat. No. 6,315,945 wherein pluralities of separate bodies are arranged such that each separate body is in contact with at least one other separate body to form an aggregate body. The aggregate body is then consolidated at a temperature, superatmospheric pressure, time at temperature and time at the superatmospheric pressure sufficient to form a consolidated shaped article. The consolidated shaped article has a shape defined by each of the separate bodies used to make the article. However, the use of superatmospheric pressure is time consuming and expensive.

U.S. Pat. No. 6,908,688 also discloses the use of superatmospheric to form a hard metal tool having different joined bodies. In this and in the other known methods significant migration of the constituents across the boundary of the parts occurs. This can lead to precipitation of embrittling phases and long gradient zones of intermediate properties, causing, in severe cases, large scale density changes and consequent distortion of the parts.

Thus, there is a need for a method of joining or fusing, pre-sintered members to form a tool of complex geometry without the need for pressure, grain growth at the boundaries or wasting of expensive material.

Figure 1:
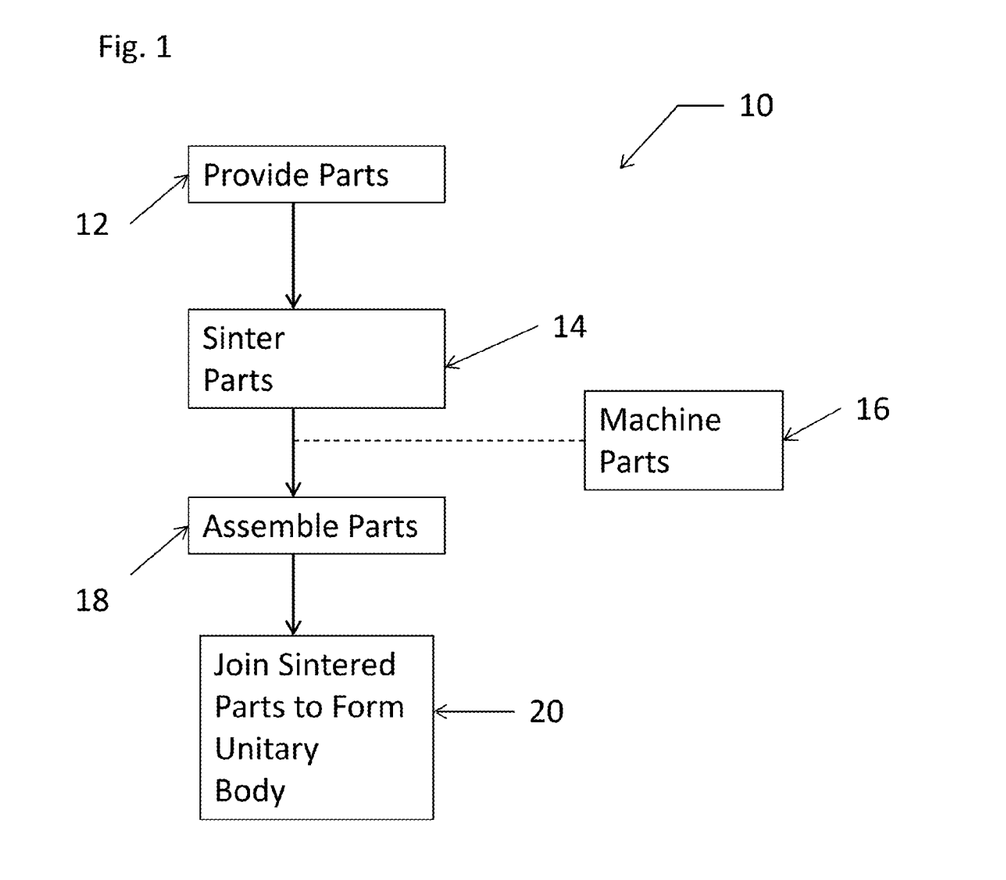
FIG. 1 is a flow diagram illustrating the steps of the present method.
Figure 2A:
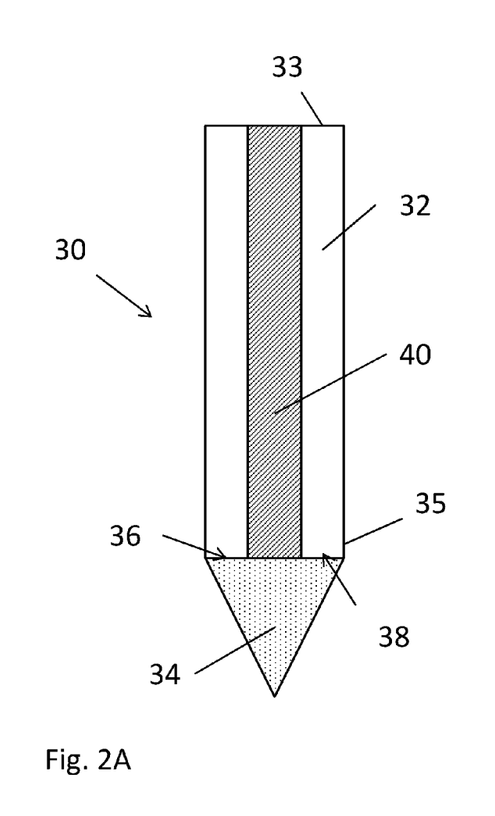
FIG. 2A is a cross-sectional view of body made according to the present method.
Figure 2B:
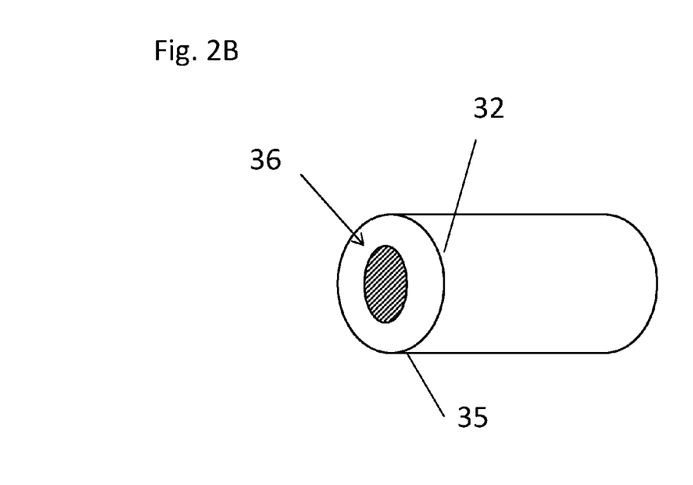
FIG. 2B is an end view of one part of the body and FIG. 2C is an end view if the other part.
Figure 2C:
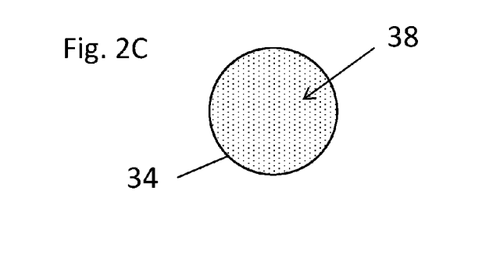
Figure 3A:
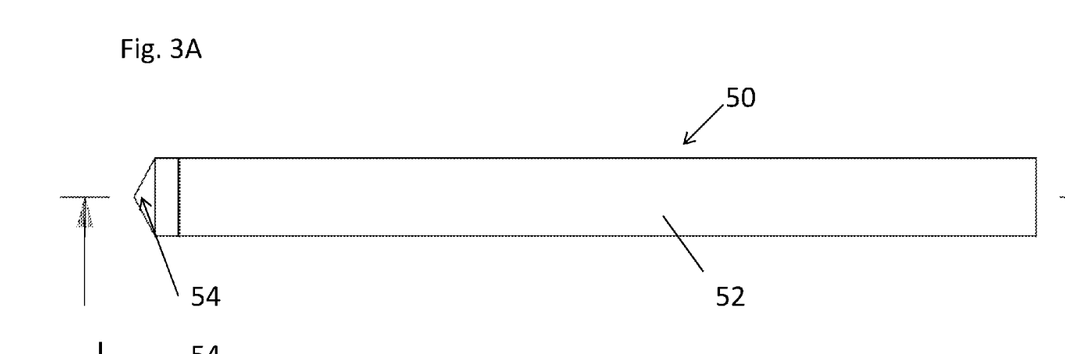
FIG. 3A is a perspective view of another body made according to the present method.
Figures 3B, 3C, 3D:
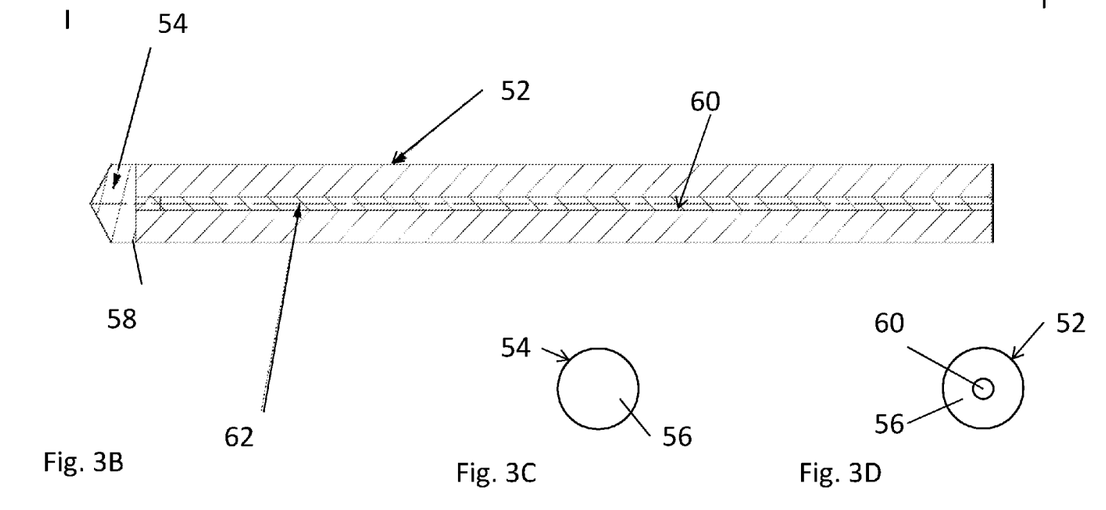
FIG. 3B is a cross-sectional view taken along line I-I of FIG. 3A.
FIGS. 3C and 3D are respective end view of the parts of FIG. 3A.

Referring to FIGS. 1 and 2, a method 10 of bonding or joining at least a pair of parts or materials is described. In a first step 12, for example, a plurality of parts are provided. The parts can be of the same size or shape or different sizes or shapes. It should also be appreciated that numerous parts can be joined according to the present disclosure, which should not be limited to a particular number of parts used to form a unitary body 30. A unitary body is defined herein as a singular body of connected parts. For example, body 30 can be a wear resistant tool, such as a step drill having different diameter parts.

The parts can be made from hard metal compositions of compacts of liquid phase sintered materials, which include low melting phase components and high melting phase components A hard metal composition is a composite material having a hard phase composed of tungsten one or more carbides, nitrides or carbonitrides of tungsten, titanium, chromium, vanadium, tantalum, niobium bonded by a metallic phase binder typically cobalt, nickel, iron or combinations thereof in varying proportions, such as a cemented carbide or cermet. A cemented carbide has a hard phase composed of tungsten carbide and of one or more carbides, nitrides or carbonitrides of titanium, chromium, vanadium, tantalum, niobium bonded by a metallic phase binder typically cobalt, nickel, iron or combinations thereof in varying proportions. A cermet has a hard phase composed of one or more carbides, nitrides or carbonitrides of titanium, chromium, vanadium, tantalum, niobium bonded by a metallic phase typically cobalt, nickel, iron or combinations thereof in varying proportions.

Cemented carbides and cermet exist in different grades. Grade refers herein to a cemented carbide or cermet in one of several proportions and with a certain grain size. A high quality grade is a material with a quantifiably greater performance and reliability in a given application.

For example, the members can be cemented carbide of the same composition, or two or more different compositions and being different with respect to grade and/or grain size that are fused together, as will be described further herein.

Each part has been sintered for obtaining substantially the full density and hardness thereof. See step 14. Each member has a joining surface 38. In step 16 the parts are ground or machined at the mating/joining surfaces to provide a sufficiently smooth finish between the parts. The parts can also be cleaned, for example, in a hydrogen cleaning process, to provide a clean interface at the joining surfaces. Thereafter, the individual, parts are assembled into the desired tool shape in step 18.

Step 20 involves bringing the parts into contact in an assembled relationship with a first bonding or joining surface 38 between the two or more of the members in mating engagement with a second bonding or joining surface between the other of the members to each define a bonding or boundary zone 36, see for example, FIGS. 2B and 2C. Thereafter, the step of heating the members in the assembled relationship is employed to fuse the members together.

In step 20, the parts are fused at a temperature low enough so that no grain growth occurs. For example, of about 1340° C. to about 1360° C. for about 10 to about 30 minutes, and more preferable about 1350° C. for about 15 minutes. In other words, the parts are fused at a temperature lower than or intermediate to the melting point of the hard metal composition having the lowest original sintering temperature of the parts. This lower temperature and shorter time enables the fusing to proceed by short range diffusion of the binder metals across the interface and no grain size changes are induced in the microstructures.

The assembled body 30 can be placed in a standard sintering furnace. A vacuum or gas atmosphere is used to during the sintering process to control the environment. The body is then brought from room temperature to the fusing temperature of about 1350° C. or higher depending on the composition, at about 450° C. per hour with about a 15 minute dwell time at the top temperature. This fusing temperature and heat cycle is lower than the original sintering temperatures and heating cycles of the part(s) of the body having the lowest sintering temperature.

This step takes the already dense and hard piece of carbide and puts it back into the sintering furnace. But, instead of getting shrinkage and a more density, as in the first sintering operation, the part remains essentially the same in physical properties. The minimal amount of liquid phase possible occurs, but still bonding is enabled to take place.

Referring again to FIG. 2, the present method enables joining of sintered parts having different sizes and shapes to form a unitary tool or wear part. Although body 30 is described in this example, it should be appreciated that, and as shown in the following examples, a body comprised of different material, sized or shaped members can be made according to the present method. Accordingly, the sizing and/or shaping of the members are a function of the particular unitary body or tool desired and the particular physical and/or dimensional characteristics are therefor according to satisfactorily meet an intended use.

Different grade materials can be joined to optimize local properties of, for example, the tool or wear part. Thus, for example, wear resistance, toughness, brazability, friction coefficient and/or cubic boron nitride (cBN) content of a material can be chosen depending on the location of the material in the tool or wear parts. Moreover, a cobalt or grain-size mismatch can also be chosen to induce binder metal fusing and consequent density changes. This can induce compressive stresses at the tool or part surfaces to provide a toughening effect. Also, multilayers having large cobalt content or grain size mismatch can be incorporated for crack deflection.

As shown in FIG. 2A, body 30 can be a tool having a hollow body or tube 32 that is sealed off at one end 33. A core 40 of material can be inserted into tube 32 via shrink fit, punch fit, brazing or any known method. The core can also be sintered, cast or depending on the material thereof filled into the tube. Core 40 can be a strengthening material such as a high speed steel (HSS). Accordingly, the cost of the tool would be significantly less than making the entire tool of carbide without sacrificing performance. A separate part, that can form a point 34 of the tool, is fused to the other end 35 of tube 32 according to the present methodology after the core is inserted.

Referring to FIGS. 3A-3D, another aspect of a tool 50 made according to the present methodology is shown. Tool 50 includes a body section 52 made of a lower quality composition, for example a low quality carbide, and a higher quality material part or point 54. Each part 50 and 52 have a joint surface 56 that are fused together at boundary zone 58. Point 54 can be made of high quality carbide. Section 52 includes an internal channel or cavity 60 containing latent heat removal material 62, such as copper, wax, fluid, for example, a cooling fluid such as water, coolant, porous foam, etc. Channel 58 can be machined in section 52 prior to fusing of the tip 54 thereto according to step 16 of FIG. 1.

Figure 4:
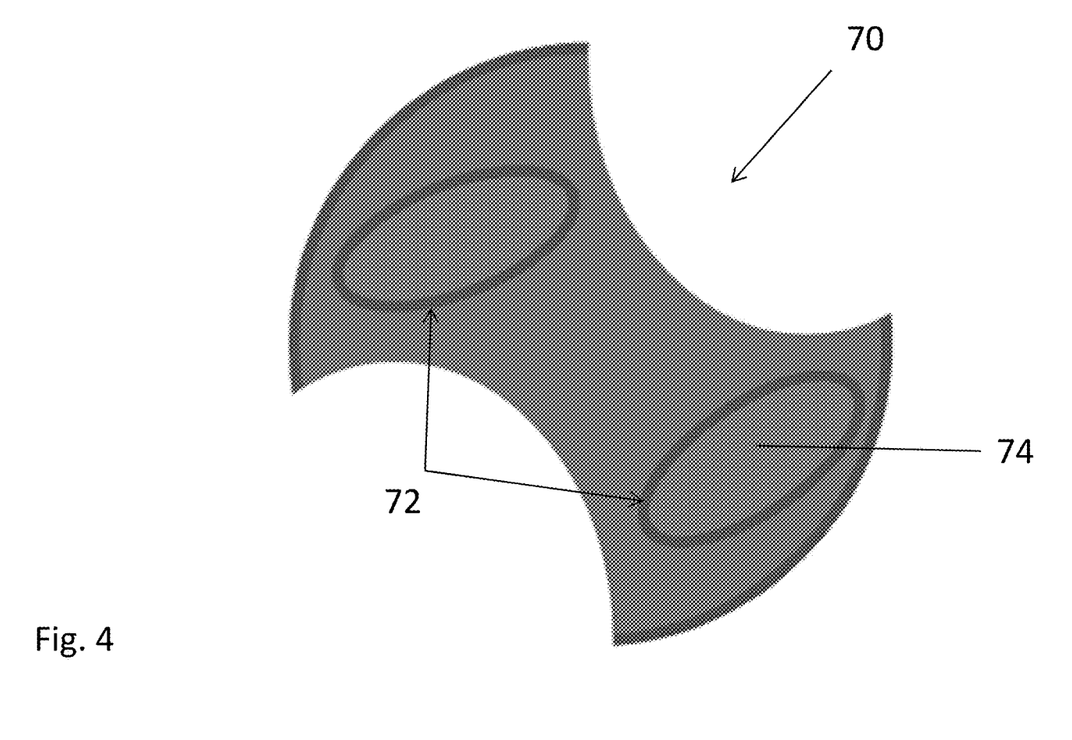
FIG. 4 is a cross-sectional view of a body made according to the present method.

As shown in FIG. 4, an extruded member 70 can be made according to another aspect of the present method. Member 72 can include at least one large channel, although a plurality of channels 72 is shown. For a drilling application, channels 72 can be sealed off and filled with core material 74, for example, copper for heat removal, as described above. No copper would be present in the web or at the surface of the member. Alternatively, core material 74 could be a porous foam providing a light, low cost alternative way to supply coolant. Channels 72 can also be left empty to vacuum away small or fine swarf internally to keep good hole quality and avoid re-cutting swarf.

Figures 5A, 5B, 5C:
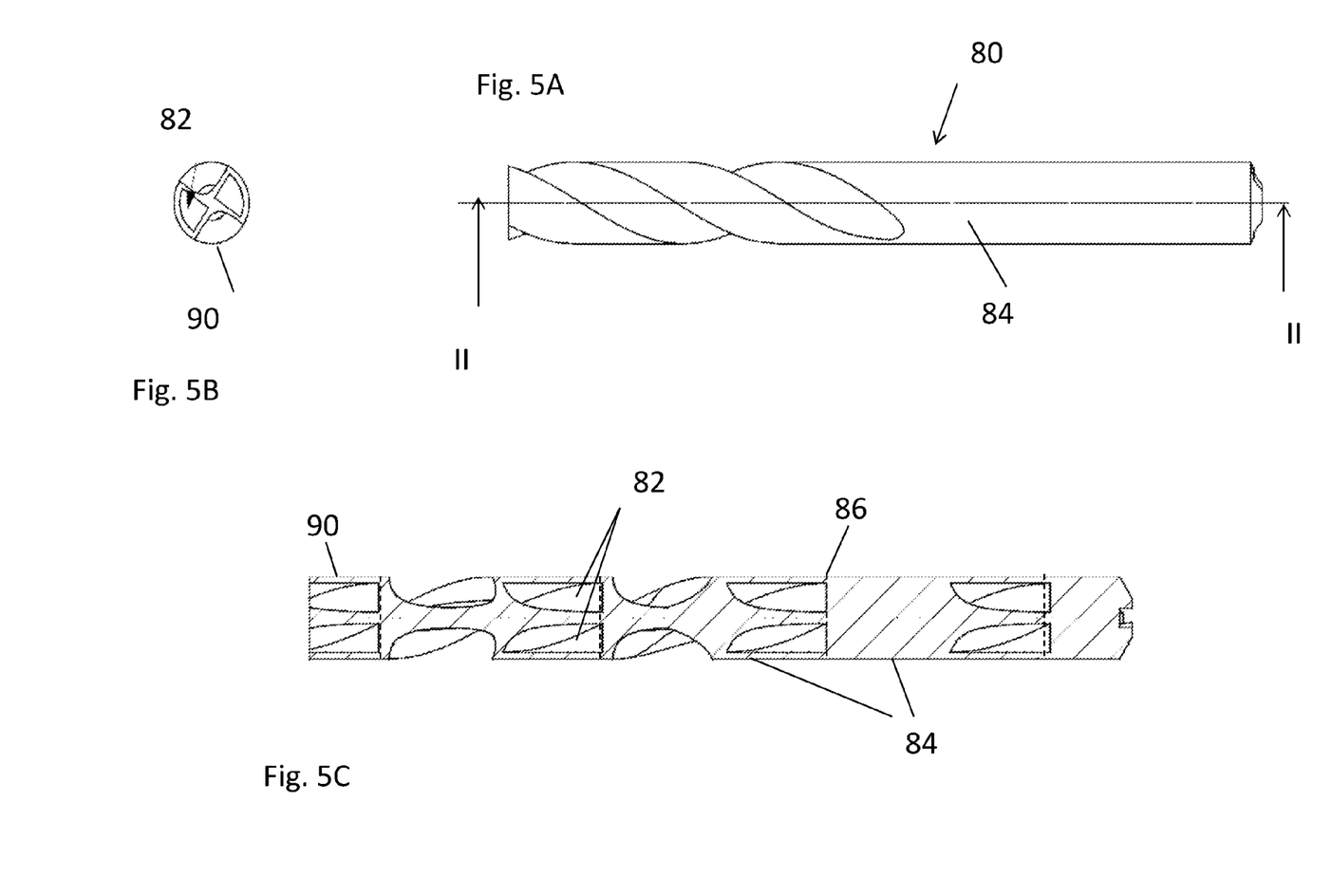
FIG. 5A is a perspective view of another body made according to the present method.
FIG. 5B is an end view of the body.
FIG. 5C is a cross-sectional view taken along line II-II of FIG. 5A.

The present method allows for the fabrication of tools having complex internal profiles. Referring to FIGS. 5A-C a tool 80, for example, a drill, has a plurality of cavities 82 for latent heat removal. The cavities can be formed in sections 84 and then the sections fused together at a joining surface 86 forming a boundary zone as described above. A plurality of cavities with complex geometry can be incorporated as desired. Prior to fusion, the cavities could be filled with heat removal material, such as copper, wax, fluid, coolant, porous foam, etc., also as described above. A part, such as a tip 90 of the point of the tool could be made of a higher quality material and the body 112 of the tool of a lower quality carbide material.

Figure 6A:
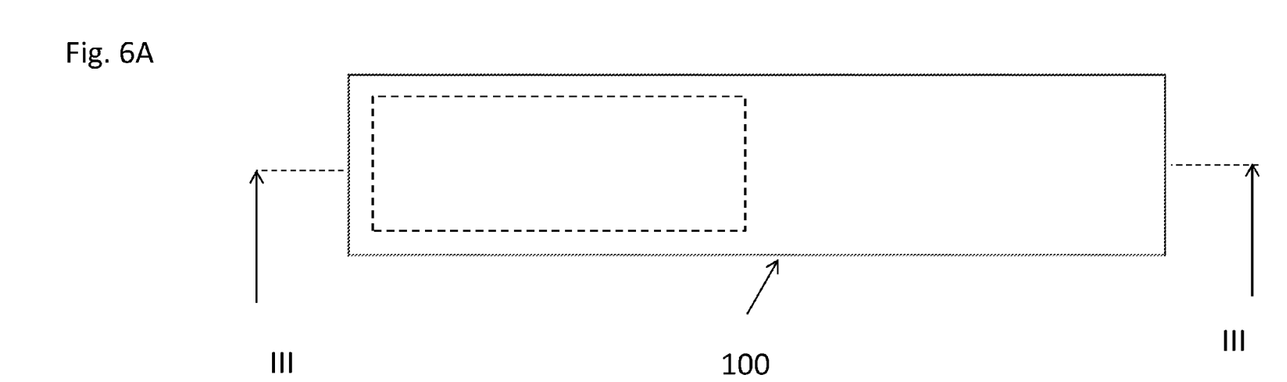
FIG. 6A is a perspective view of another body made according to the present method.
Figure 6B:
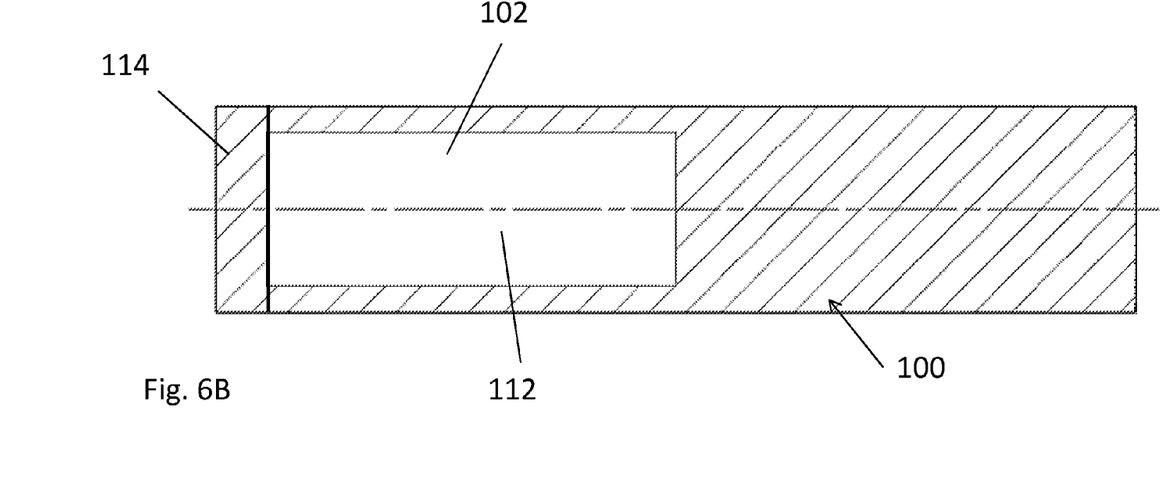
FIG. 6B is a cross-sectional view of the body taken along line III-III of FIG. 6A.

FIGS. 6A and 6B illustrate a shank 100 having a cavity 102 enclosed therein made according to the present method. Cavity 102 can also be filled with a damping material 112. The damping material can be a fluid to minimize or reduce vibration. The damping material could also be filled with spheres or shots of alumina or alumina-coated material. In another example, the damping material could be a sliding block of alumina or alumina-coated material that can move within the cavity to act as a regulator, switch or position indicator. The cavity can also be left empty for weight reducing purposes. As described above another part 114 can be fused to shank 112.

The disclosed method can be used to build complex shapes from a stock of different parts allowing for under cuts, side holes, voids, profile changes etc., but avoiding MAP/PIM or machining.

Most importantly, any of the above features can be combined in a single tool or part. For example, different parts can be carefully selected and joined together to suit particular applications where wear, chemical resistance, etc. is required.

The present methodology offers many advantages, included but not limited to, significant cost savings and environmentally friendly production. Key advantages also include formation of complex shapes not possible by conventional processing or machining. Also material combinations not possible by current methods can be achieved.

Although the present disclosure has been described in relation to particular embodiments thereof, many other variations and modifications and other uses will become apparent to those skilled in the art. It is preferred therefore, that the present disclosure be limited not by the specifics disclosed herein, but only by the appended claims.

What is claimed is:

1. A method of joining a plurality of parts to form a unitary body comprising:
   providing at least two sintered parts, each of the sinter parts being formed of a hard metal composition of material, at least one of the sintered parts having at least one internal cavity;
   assembling the at least two sintered parts into a shape of a unitary body, wherein each of the at least two parts has a joining surface and when each joining surface is brought into contact the joined surfaces form a bonding interface therebetween; and
   subjecting the assembled parts to a vacuum or gas atmosphere, without the application of external pressure, and to a temperature sufficient to fuse the at least two sintered parts together at the bonding interface to form the unitary body.

2. The method of claim 1, wherein the hard metal composition of material is cemented carbide.

3. The method of claim 2, wherein the cemented carbide has a hard phase of tungsten carbide and of one or more carbides, nitrides or carbonitrides selected from titanium, chromium, vanadium, tantalum, niobium bonded by a metal phase selected from cobalt, nickel, iron and combinations thereof.

4. The method of claim 2, wherein each of the at least two sintered parts is made of the same cemented carbide.

5. The method of claim 2, wherein each of the at least two sintered parts is made of a different cemented carbide.

6. The method of claim 1, wherein the hard metal composition of material is a cermet.

7. The method of claim 6, wherein the cermet has a hard phase selected from one or more carbides, nitrides or carbonitrides of titanium, chromium, vanadium, tantalum, niobium bonded by a metallic phase selected from cobalt, nickel, iron and combinations thereof.

8. The method of claim 1, wherein the at least two sintered parts each have a sintering temperature, the assembled parts being heated to a temperature lower than a melting point of the sintered part having a lowest of the sintering temperature of the at least two sintered parts to fuse the parts at the bonding interface.

9. The method of claim 1, wherein the temperature the assembled parts are heated to is of about 1340° C. to about 1360° C.

10. The method of claim 9, wherein the assembled parts are heated for a time period of about 10 to about 30 minutes.

11. The method of claim 9, wherein the assembled parts are heated to about 1350° C. for about 15 minutes.

12. The method of claim 1, wherein each of the at least two sintered parts has a different shape.

13. The method of claim 1, wherein the unitary body is a wear resistant tool.

14. The method of claim 1, wherein the unitary body is a tool blank.

15. The method of claim 1, wherein the unitary body is a wear part.

16. The method of claim 1, wherein each of the at least two sintered parts has a different size.

17. The method of claim 1, further comprising machining the at least one of the sintered parts with at least one internal cavity prior to the steps of assembling and fusing the parts together.

18. The method of claim 17, further comprising disposing a thermal conductive material in the at least one internal cavity prior to the steps of assembling and fusing the parts together.

19. The method of claim 18, wherein the thermal conductive material is selected from copper, fluid, coolant and porous foam.

20. The method of claim 17, further comprising disposing a vibration minimizing material in the at least one internal cavity prior to the steps of assembling and fusing the parts together.

21. The method of claim 20, wherein the vibration minimizing material is selected from fluid, alumina spheres and alumina coated spheres.

22. The method of claim 20, wherein the vibration minimizing material is a block of alumina or alumina-coated material movably disposed within the at least one internal cavity.

23. The method of claim 17, wherein at least one of the sintered parts is a hollow tube and further comprising disposing a strengthening material in the hollow tube prior to the steps of assembling and fusing the parts together.

24. The method of claim 23, wherein the strengthening material is high speed steel.

* * * * *